Figure 1:
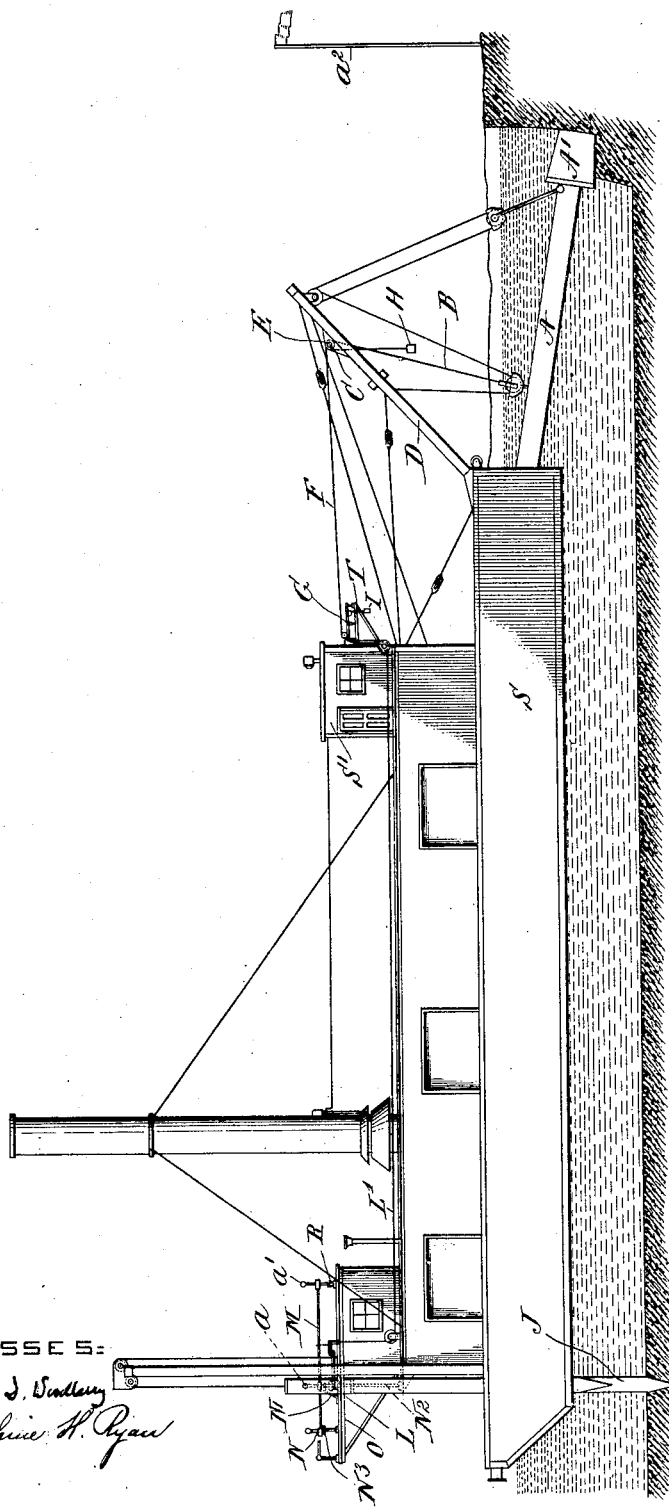

No. 890,470. PATENTED JUNE 9, 1908.
H. S. TAFT & U. THOMPSON, Jr.
DREDGING APPARATUS.
APPLICATION FILED JAN. 13, 1908.

8 SHEETS—SHEET 2.

WITNESSES:
Charles D. Woodbury
Josephine H. Ryan

INVENTORS=
Harrison Southwick Taft
Uldric Thompson Jr.
by
Odin Roberts,
Attorney No. 890,470. PATENTED JUNE 9, 1908.
H. S. TAFT & U. THOMPSON, JR.
DREDGING APPARATUS.
APPLICATION FILED JAN. 13, 1908.

8 SHEETS—SHEET 5.

WITNESSES=
INVENTORS=

No. 890,470. PATENTED JUNE 9, 1908.
H. S. TAFT & U. THOMPSON, Jr.
DREDGING APPARATUS.
APPLICATION FILED JAN. 13, 1908.

8 SHEETS—SHEET 6.

No. 890,470. PATENTED JUNE 9, 1908.
H. S. TAFT & U. THOMPSON, Jr.
DREDGING APPARATUS.
APPLICATION FILED JAN. 13, 1908.

8 SHEETS—SHEET 7.

No. 890,470. PATENTED JUNE 9, 1908.
H. S. TAFT & U. THOMPSON, Jr.
DREDGING APPARATUS.
APPLICATION FILED JAN. 13, 1908.

8 SHEETS—SHEET 8.

WITNESSES:
Charles D. Woodbury
Josephine H. Ryan

INVENTORS:
Harrison Southwick Taft
Uldric Thompson jr
by
Davis Roberts
Attorney

UNITED STATES PATENT OFFICE.

HARRISON SOUTHWICK TAFT, OF NEW YORK, N. Y., AND ULDRIC THOMPSON, JR., OF HONOLULU, TERRITORY OF HAWAII.

DREDGING APPARATUS.

No. 890,470.     Specification of Letters Patent.     Patented June 9, 1908

Application filed January 13, 1908. Serial No. 410,512.

*To all whom it may concern:*

Be it known that we, HARRISON SOUTHWICK TAFT, of the city, county, and State of New York, and ULDRIC THOMPSON, Jr., of Honolulu, Territory of Hawaii, citizens of the United States, have invented new and useful Improvements in Dredging Apparatus, of which the following is a specification.

Our invention relates to the practice of dredging waterways, particularly canals and channels, and consists in apparatus applicable to dredges whereby the control over the dredging operations is improved and accuracy and facility of operation secured.

As a type of dredging apparatus to which our invention is applicable, we select for illustration a rotary-cutter or boring dredge. The present mode of operation of such a dredge involves fixing or mooring the floating hull thereof by means of anchored side guys and a vertical timber called the spud, which, when fixed in the bottom of the canal, channel, or other body of water, serves as a pivot on which the dredge may be moved laterally in the waterway. The spuds are located at or near the end of the hull farthest from the cutter, which is suspended on the end of a vertically movable arm, called the ladder; the cutter is rotated by machinery located in the hull, and cuts away earth in successive arcs, as the dredge hull is swung from side to side about the depressed spud as a center. Wire cables, running to anchors fixed at convenient points on either side of the dredge, serve to impart the lateral swinging movement to the dredge, the machinery which operates these cables being under the control of the man who guides the movements of the dredge. In cutting canals or channels, a cross-section of the canal or channel is determined on, and the dredge set to work to excavate in accordance with the said cross section. The depth to which the dredge cutter is allowed to fall determines the vertical dimension of excavation, and the amount of lateral movement of the dredge determines the lateral dimension.

When a section of the excavation has been cut, the dredge is moved forward by sinking another spud ahead of the one last employed, raising the latter, and moving the second spud aft on the dredge, thus moving the dredge ahead. As the dredge cutter works for the most part under water, it is difficult for the "lever man", who directs the movements of the dredging machinery, to guess with any degree of certainty how near the cutter is operating to the prescribed cross section. This uncertainty is increased when the finishing act is given to a channel requiring an inclined side, as the lever man has to give the cutter its vertical adjustment while the dredge hull is given its lateral movement; the securement of an accurate resultant motion is largely a matter of chance. Many arrangements of sighting flags and guide poles have been employed to assist the eye of the operator in making his adjustments, but these have never, so far as we are aware, given much satisfaction.

Our invention consists in an arrangement of apparatus in combination with the elementary dredge mechanism, whereby a tracer or pointer, in view of the lever man, shows at all times on a table or diagram-sheet, the exact location of the dredging cutter in relation to a predetermined cross section of excavation. The excavation outline may be drawn in reduced scale on the diagram-table, and the movements of the tracer are then reduced in the same ratio, as compared with the movements of the dredge and its cutter. This arrangement, presently to be described in detail, enables the lever man to direct his operations exactly as though he could see the cutter at all times and had visible guides in the earth to show exactly the limits of cut.

Figure 2:
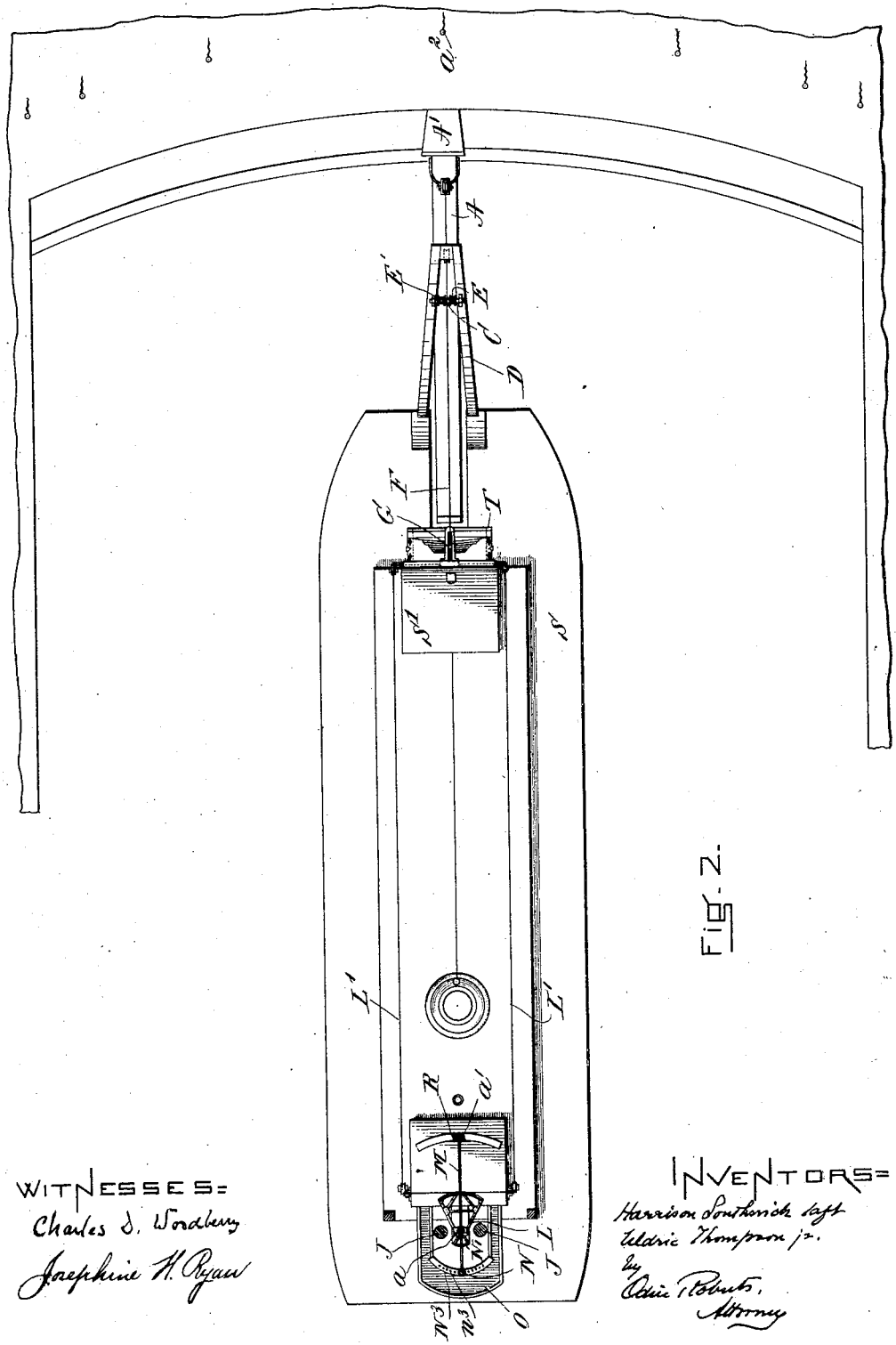
Figure 3:
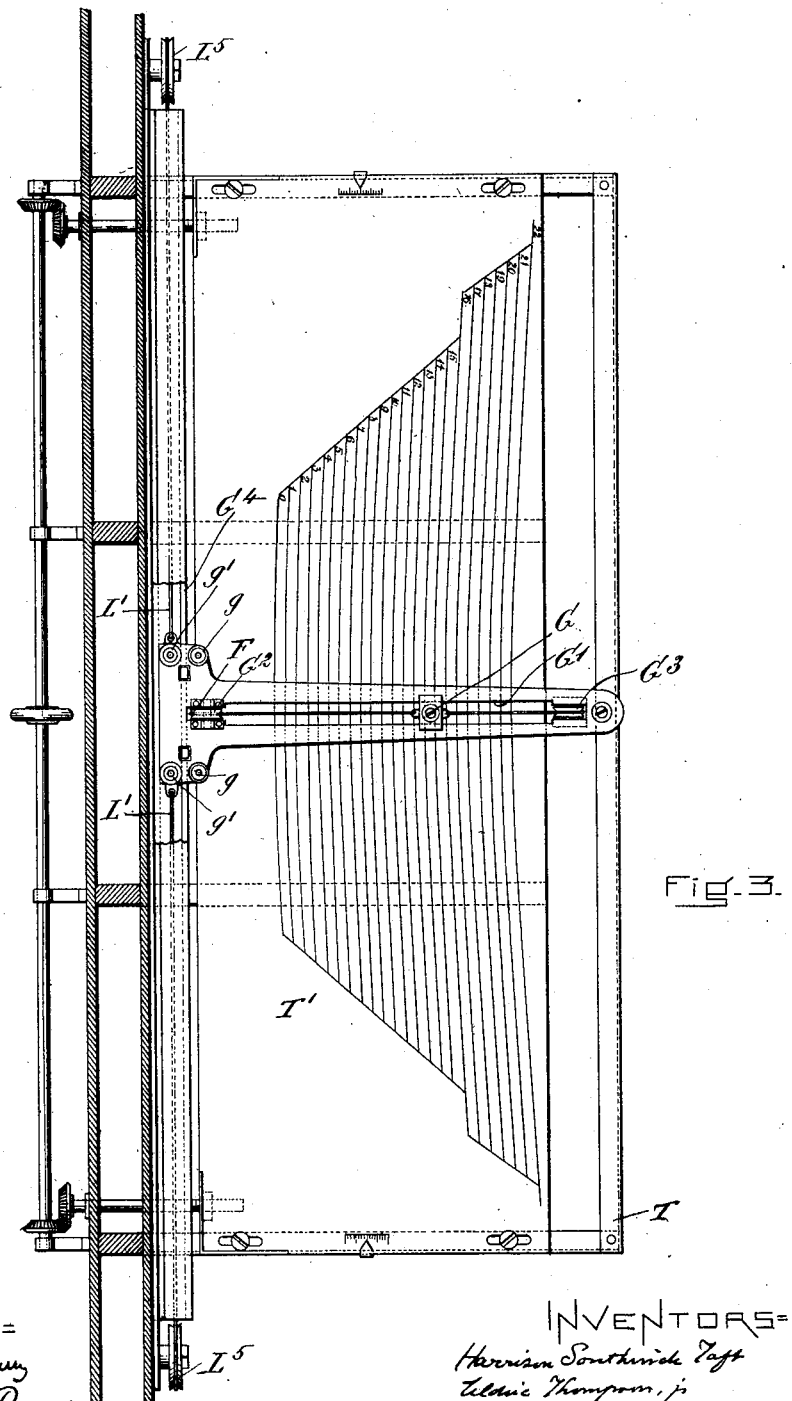
Figure 4:
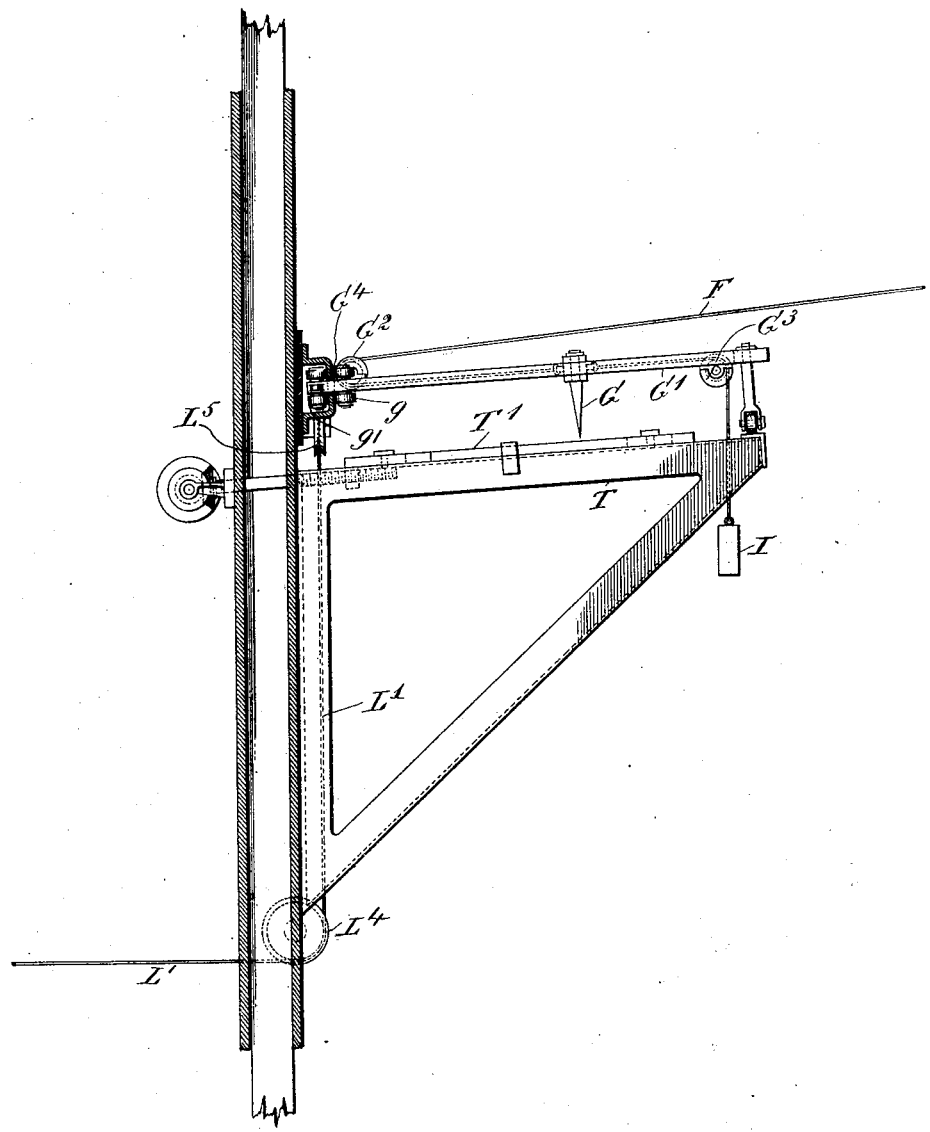
Figure 5:
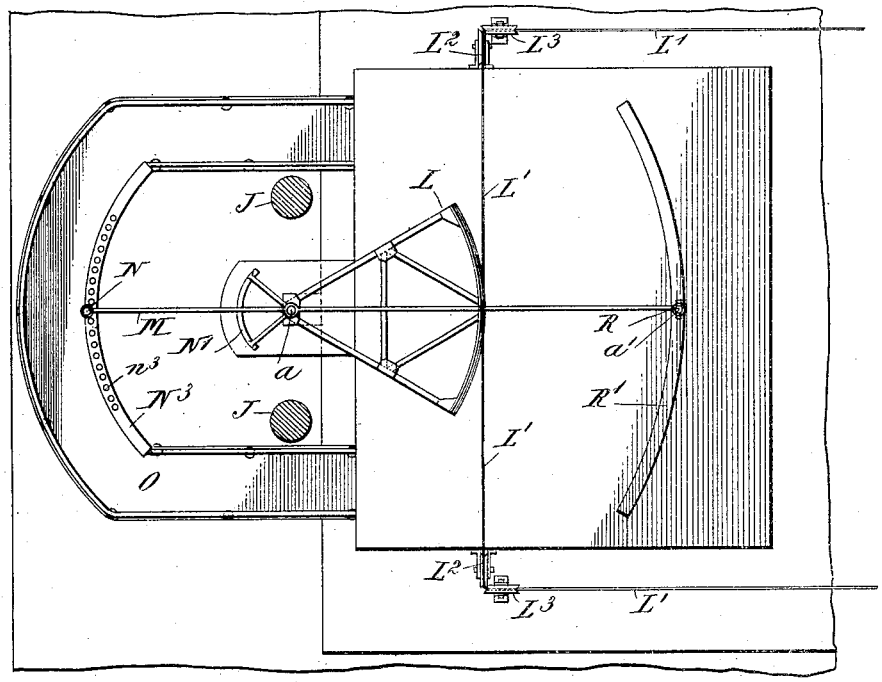
Figure 6:
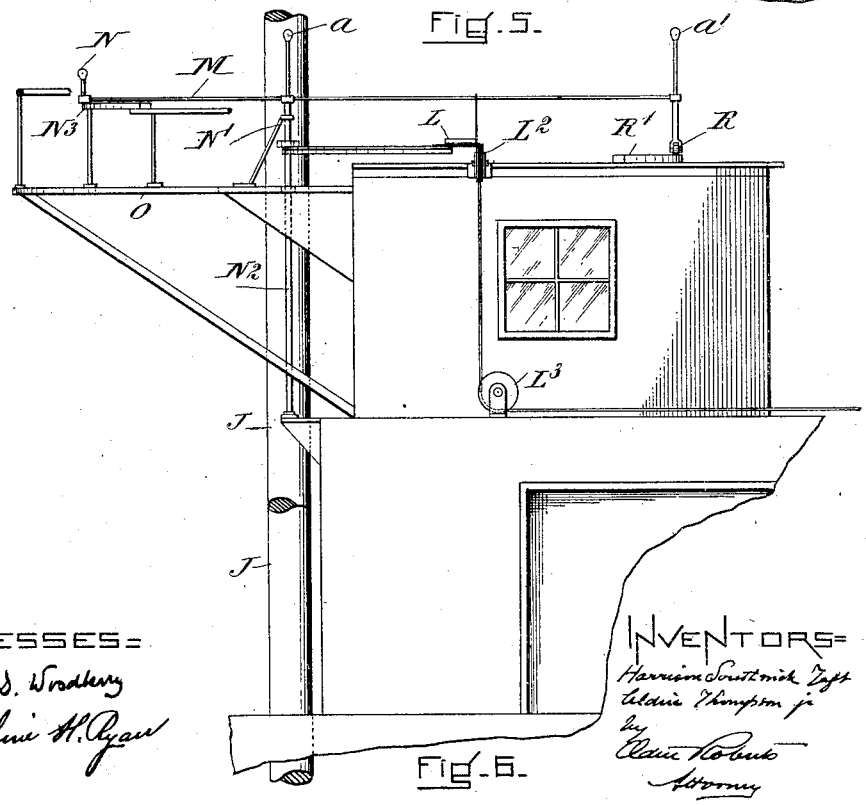
Figure 7:
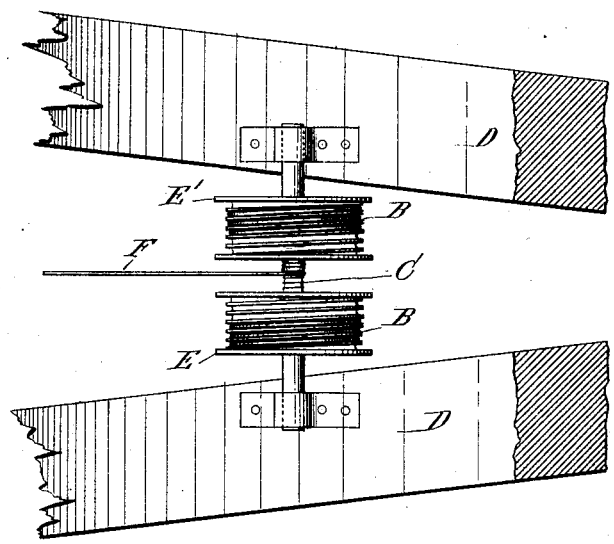
Figure 8:
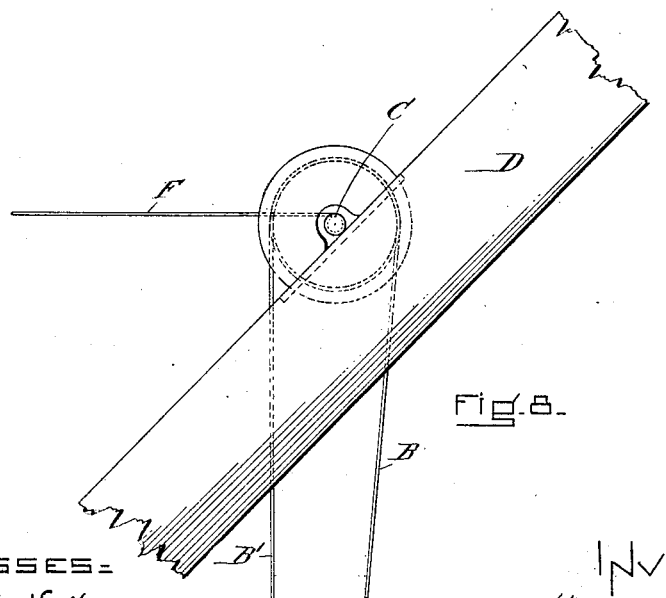
Figure 9:
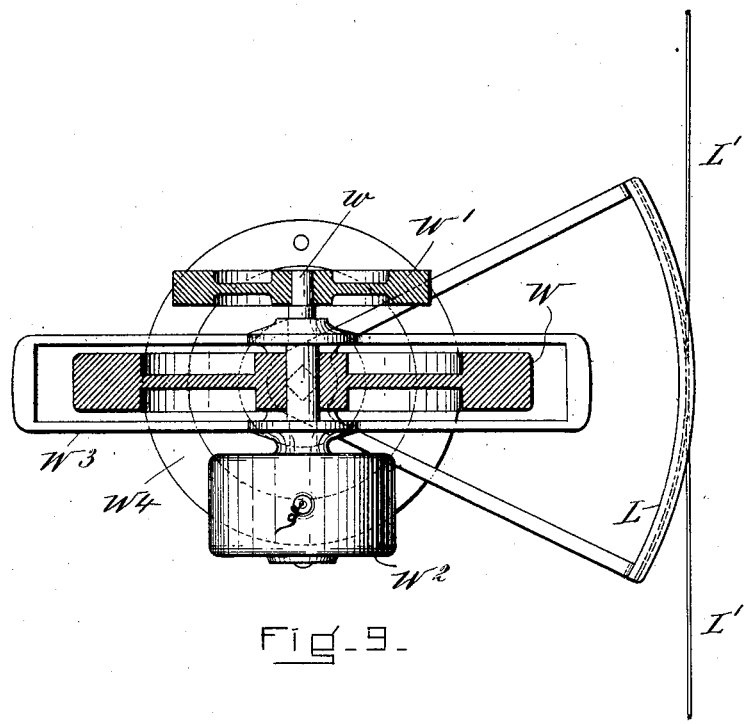
Figure 10:
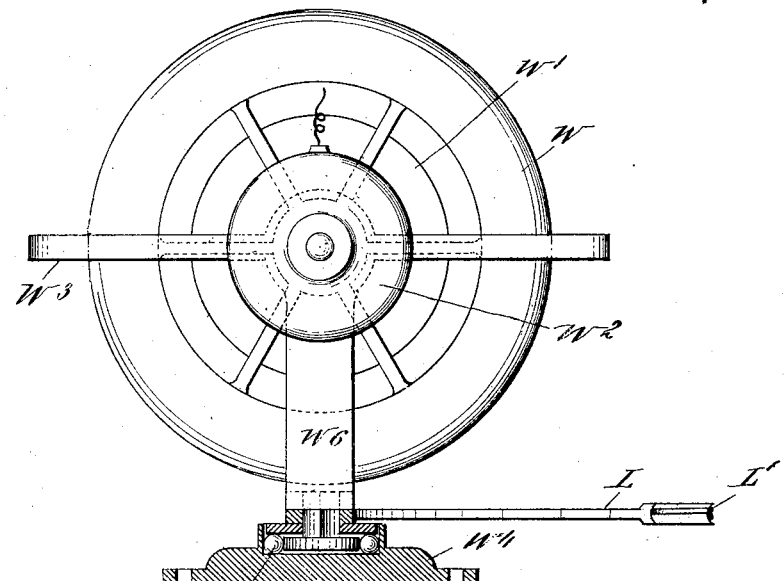
Figure 11:
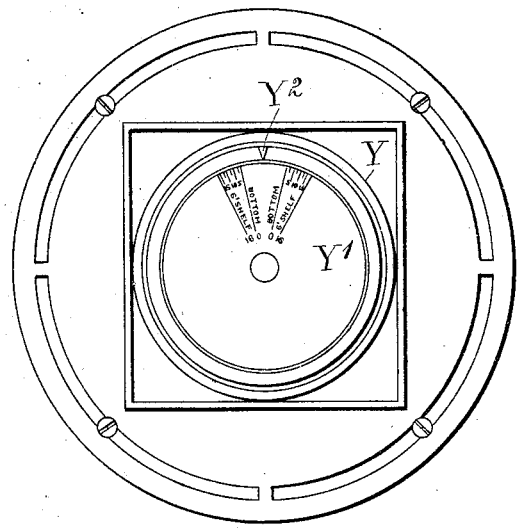
Figure 12:
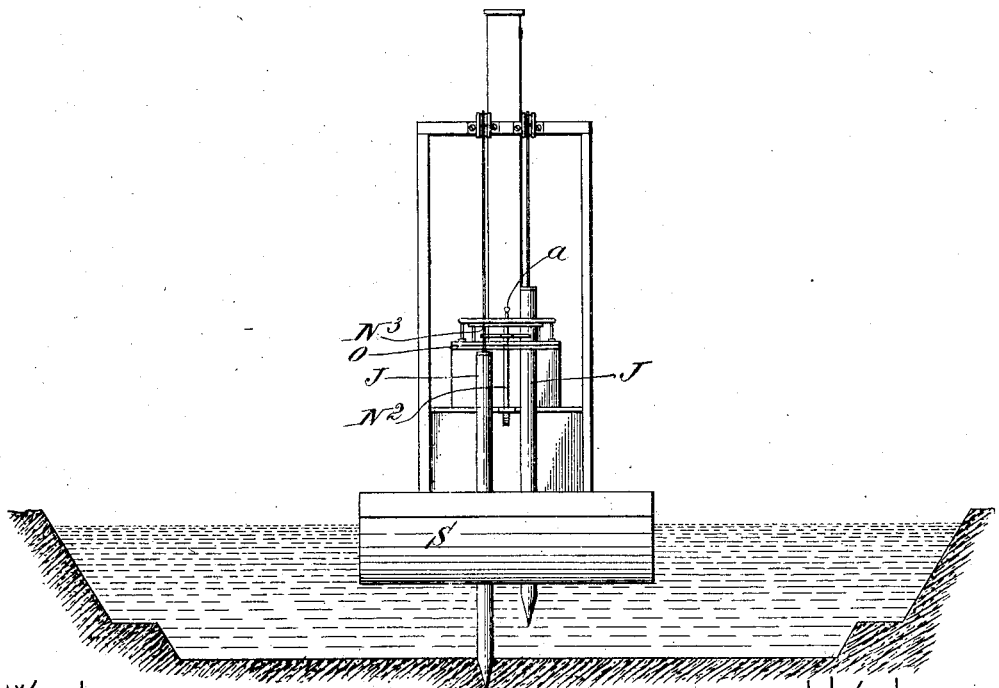

In the drawings hereto annexed, which illustrate forms in which our invention may be embodied, Figure 1 is a longitudinal elevation of a cutter dredge, showing a mode of applying and operating our invention; Fig. 2 is a plan view of the dredge shown in Fig. 1; Fig. 3 is a plan view, on a larger scale than that used for Figs. 1 and 2, of the diagram table and tracer which forms a part of our invention; Fig. 4 is a side elevation of the diagram table and tracer shown in Fig. 3; Fig. 5 is a plan view, also on a liberal scale, of the manually operated sighting device included in Figs. 1 and 2; Fig. 6 is a side elevation of the sighting device illustrated in Fig. 5; Fig. 7 is a plan view of the reducing motion between the cutter ladder and tracer; Fig. 8 is a side elevation of the detail shown in Fig. 7; Fig. 9 is an automatic gyroscopic sighting device, shown in plan; Fig. 10 is a side elevation of the device shown in Fig. 9; Fig. 11 is a plan view of a compass bowl and attachments which may be employed in connection with the apparatus; and Fig. 12 is a cross sectional view, showing the dredge and a typical channel cross section.

Referring to Figs. 1 and 2, S represents the hull of a dredge, A the cutter ladder, A′ the cutter, D the A-frame on which the cutter operating blocks are hung, S′ the lever-house which contains the controlling lines for operating the dredge and its cutter, J one of the spuds, shown as depressed into the channel-bottom and serving as the pivot on which the dredge turns laterally.

At some point within easy observation distance from the man in the lever-house, a table T is fixed, on which a sheet of paper or diagram-card may be secured. A tracer, G, is movably mounted over the table T, and operated as follows:

From some convenient point on the cutter ladder, a wire B is led to the drum E, pivoted on the frame D. A counterweight H is suspended from the drum E by a wire in such manner that the wire B is always kept taut. From the shaft C of the drum E the wire F is led to the tracer G and thence to a counterweight I, which holds wire F suitably taut. The relative diameters of the drum E and shaft C are such that the movement of the tracer G over the table T, due to the extreme up and down movement of the ladder A, may not carry the tracer beyond the margins of the table. The movement of the cutter A′ will bear a substantially constant ratio to that of the tracer G, the deviation due to the circular movement of the ladder A is not of any practical consequence in the dredging operation.

In order to communicate to the tracer G a movement over the table T which shall correspond with the lateral swing of the dredge, we provide, in the arrangement shown in Figs. 1 and 2, a manually operated sighting device. On a platform O there is mounted a stand N′ on which the horizontal bar M is pivoted. At N there is provided a handle and at R a roller on a circular track concentric with the pivot on which the bar M turns. Sights $a$, $a'$ are mounted on the bar M at a suitable elevation, sight $a$ being directly over the pivot and sight $a'$ near the forward end of the bar. The pivot of bar M consists of a vertical shaft which is secured to bar M and extends down to a sector L, from which a wire L′ extends forward to the carriage on which the tracer G is mounted. The details of this mechanism will presently be described; suffice it to say for the present that the horizontal component of movement of the tracer G is communicated from the sighting device which, as the dredge swings, is kept pointed at some fixed distant object, as the flag $a^2$, and consequently swings with relation to the dredge, while the vertical component of movement of the tracer G is communicated from the ladder A by means of the reducing motion above described in its mere elements. Whatever may be the ratio of reduction of these two component movements, it is clear that the tracer G, so long as the sights $a$, $a'$ are kept trained on the flag $a^2$, will correctly represent the position of the cutter A′. If, therefore, a cross section of the channel to be cut is laid out to proper scale on the diagram table T, so long as the tracer G is kept within the limits of the cross sectional chart, the cutter will be sure to operate within its proper range; and the lever man in control of the dredge can gage the lateral swing correctly, checking the swing when the tracer comes to the line which, on the diagram, represents the side of the excavation to be made. A man stationed at N has only to keep his sights $a$, $a'$ always trained on the flag $a^2$. As the cutter A′ is lowered from time to time to take deeper cuts in the earth, the tracer G will move downward on the diagram, and, as the sides of the channel will probably be sloping, the angle of swing of the dredge will diminish as the cutter A′ moves from one level to the next. When the rough cuts have been made in the excavation, the sloping sides of the channel are smoothed by a slanting cut. In this operation the lever man will be greatly assisted by the tracer G; by observing its movement along the line of the diagram he can adjust the rate of swing to the rate of vertical movement of the cutter A′ so that the resultant movement of the cutter will make a true slanting cut, and not cut too lightly at one place and gouge too deeply at another.

When the cross section of channel is cut, the dredge is "spudded ahead" in the manner described. Though the spuds J are not in the same fore-and-aft line on the dredge, the lateral shift of the center of swing is not great enough to make any practical difference in the operation of the sighting device. A dredge is not an instrument of precision, and the demands on it for accuracy are moderate. As heretofore operated, however, the errors in excavation have often been serious and costly to repair; the employment of the within described invention insures precision of operation up to the capacity of the dredging apparatus as a whole, and enables the lever man to accomplish easily what heretofore would have been considered the feat of an expert.

The details of the apparatus above described in general are as follows: Fig. 3 shows in plan and Fig. 4 in elevation the diagram table and tracer which, as shown in Figs. 1 and 2, is located immediately in the view of the man controlling the dredge levers. The tracer itself, G, is mounted to slide in a guide G′ and its sliding movement in this guide is governed by the wire F leading from the reducing motion on the A-frame. This wire passes over the pulley G², thence to the pointer G, to which it is secured, and continues over the pulley G³ to the counterweight I which serves to keep the wire stretched tight. As the dredge cutter moves up or down, the above described connections cause the pointer of the tracer G to move up or down in the guide G′ over the diagram board T′. This diagram board is shown as adjustably secured to the frame or table T and, as shown in Fig. 3, a diagram of the cross section of the excavation is laid out and the various cutting levels are marked and numbered thereon. The lateral traverse of the tracer G over the excavation diagram is secured by movement of the guide G′ laterally over the board T′. This guide is provided at its base with rollers $g$, $g$, $g'$, $g'$, which run on either side of the track G⁴, this track being secured to some stationary base. Wires L′ lead from the roller portion of the guide G′ over suitable pulleys to the lateral movement actuator which, as shown in Figs. 1 and 2, may be a manually operated sighting device, or, as shown in Figs. 9 and 10, an automatic "sighting" device which maintains its position irrespective of movements of the dredge.

Referring to Figs. 5 and 6, which show on an enlarged scale the manually operated sighting device indicated in Figs. 1 and 2, the wires L′, which are secured to the traversing tracer guide (Figs. 3 and 4) pass over the guide pulleys L⁵, L⁴, L³, L², to the quadrant or sector L. This sector is secured to the vertical shaft N² mounted on a frame N′, this frame being located on the sighting platform O. The shaft N² is located midway between the spuds J and secured to this shaft is the arm M which has at its rear end the operating handle N and at its forward end the roller R which travels on the track R′. Directly over the shaft N² there is placed the sight $a$ and directly over the roller R the sight $a'$ is located. The operating handle N works over a circular arc N³ which may be provided, as shown in Fig. 5, with a series of holes $n^3$ for the reception of plugs or stops to limit the lateral swing of the arm M. These plugs or stops and the arm M may conveniently be made to carry contact points for an electric signaling circuit, so that in addition to the traversing tracer G, the man in control of the dredge may be given a warning as by the ringing of a bell whenever the sighting lever has reached the prescribed limit of its lateral swing.

Referring now to Figs. 7 and 8: these figures illustrate on an enlarged scale the reducing motion from the cutter ladder A to the tracer G. The wire B secured at its lower end to the cutter ladder A is secured to and wound upon the drum E which is keyed to the shaft C. Another drum E′ carries the counterweight wire B to which the counterweight H is secured. The wire F which leads to the tracer is secured to and wound upon the shaft C. Thus, the difference in diameter as between the shaft C and the drum E determines the ratio of reduction, in other words, the scale of the tracer diagram on the tracer board T′. (See Figs. 4 and 5).

Obviously the employment of a manually operated sighting device such as illustrated in Figs. 5 and 6, involves the employment of a man to stand at the sighting device and operate it. As it may be advisable to dispense with the services of a man at the sighting device, both for reasons of economy and also for the reason that constant watchfulness is the price of accurate service of this character, we have shown in Figs. 9 and 10 an automatic sighting device which may be located at any convenient point on the dredge. A heavy fly wheel W is mounted on the shaft $w$ in the swiveling frame W³, this frame being mounted on columns W⁶ which swivel on the base W⁴, an antifriction ball or roller bearing W⁵ being preferably supplied. The sector L is secured to the columns W⁶ and carries the wires L′ as in the manually operated device shown in Figs. 5 and 6. The fly wheel W is rapidly rotated by means of an electric motor W² and on the end of the shaft farthest from the motor W² a fly wheel W′ may be attached to balance the weight of the motor. The frame W³ is turned by hand upon the base W⁴ until the tracer G is observed to be in a position which corresponds exactly with the position of the dredge cutter in the excavation and then the motor W² is started. The rapid rotation of the fly wheel W supplemented by that of the rotor of the motor W²' and the counterbalancing fly wheel W′, preserves the direction in which this sighting frame was originally set and if the motor W² be kept in operation while the dredge is at work, the movement of the tracer G laterally over the diagram table will correspond exactly to the movement of the dredge cutter in the excavation.

As an additional guide for the man in control of the dredge levers, we provide an attachment to a mariner's compass such as shown in Fig. 11, wherein Y is the compass bowl and Y′ a card which may be placed upon the ordinary compass card. Y² represents the usual fixed point or "lubbers mark" in the compass bowl. The card Y′ is provided with radial markings which correspond to the lateral angular swing of the dredge necessary to make the excavation cuts at the different levels. As the dredge swings the approach of the scale markings on card Y′ to the lubbers mark Y² gives the operator notice in addition to the devices already described of the approach of the cutter to the proper limit of its lateral swing.

What we claim and desire to secure by Letters Patent is:

1. The combination in a laterally movable dredge, of a vertically adjustable dredging instrument, a diagram table mounted on the dredge, a tracer movable over the diagram table, and connections between the tracer and the dredging instrument to change the position of the tracer in relation to the table as the dredging instrument is raised or lowered.

2. The combination in a laterally movable dredge, of a vertically adjustable dredging instrument, a diagram table mounted on the dredge, a tracer movable over the diagram table, and connections between the tracer and the dredging instrument to change the position of the tracer in relation to the table as the dredging instrument is raised or lowered, and means mounted on the dredge to disclose the amount of lateral movement of the dredge.

3. The combination in a laterally movable dredge, of a diagram table mounted on the dredge, a tracer movable over the diagram table, a pivoted sighting device and connections therefrom to the tracer, to move the tracer in relation to the table as the angular relation of the dredge and sighting device changes.

4. The combination in a laterally movable dredge, of a diagram table mounted on the dredge, a tracer movable over the diagram table, a pivoted sighting device and connections therefrom to the tracer to move the tracer in relation to the table as the angular relation of the dredge and sighting device changes, a vertically adjustable dredging instrument, and connections therefrom to the tracer to change the position of the tracer in relation to the table as the dredging instrument is raised or lowered.

5. The combination in a laterally movable dredge, of a vertically adjustable dredging instrument, a diagram table mounted on the dredge, a diagram board adjustably secured to said table, a tracer mounted over said diagram table, and connections between the tracer and the dredging instrument to change the position of the tracer in relation to the table as the dredging instrument is raised or lowered.

6. The combination in a laterally movable dredge, of a diagram table mounted on the dredge, a diagram board adjustably secured to said table, a pivoted sighting device and connections therefrom to the tracer to move the tracer in relation to the table as the angular relation of the dredge and sighting device changes.

7. The combination in a laterally movable dredge, of a cutter ladder, a vertically adjustable dredging instrument suspended therefrom, a diagram table mounted on the dredge, a tracer movable over the diagram table, a reducing motion, connections therefrom to said cutter ladder and said tracer, to change the position of the tracer in relation to the table as the dredging instrument is raised or lowered.

8. The combination in a laterally movable dredge, of a cutter ladder, a vertically adjustable dredging instrument suspended therefrom, a diagram table mounted on the dredge, a tracer movable over the diagram table, a reducing motion, connections therefrom to said cutter ladder and said tracer, to change the position of the tracer in relation to the table as the dredging instrument is raised or lowered, and means mounted on the dredge to disclose the amount of lateral movement of the dredge.

9. The combination in a laterally movable dredge, of a cutter ladder, a vertically adjustable dredging instrument suspended therefrom, a diagram table mounted upon the dredge, a tracer movable over the diagram table, a reducing motion, comprising a shaft, a plurality of drums mounted on said shaft, a flexible connection wound upon one of said drums and having its upper end secured thereto and its lower end secured to said cutter ladder, a flexible band carrying a counterweight wound upon and secured to another of said drums, a flexible connection secured at one end to said tracer and having its other end secured to and wound around said shaft, said reducing motion adapted to change the position of the tracer with relation to the table as the dredging instrument is raised or lowered.

10. The combination in a laterally movable dredge, of a cutter ladder, a vertically adjustable dredging instrument suspended therefrom, a diagram table mounted upon the dredge, a tracer movable over the diagram table, a reducing motion comprising a shaft, a plurality of drums mounted on said shaft, a wire wound upon one of said drums and having its upper end secured thereto and its lower end secured to said cutter ladder, a wire carrying a counterweight wound upon and secured to another of said drums, a wire secured at one end to said tracer and having its other end secured to and wound around said shaft, said reducing motion adapted to change the position of the tracer with relation to the table as the dredging instrument is raised or lowered, and means mounted on the dredge to disclose the amount of lateral movement of the dredge.

11. The combination in a laterally movable dredge, of a vertically adjustable dredging instrument, a reducing motion actuated by vertical movement of the dredging instrument, a diagram table mounted on the dredge, a guide secured over said table, a tracer slidably mounted in said guide, a plurality of pulleys mounted on said guide, a wire leading from said reducing motion passing over one of said pulleys, secured to said tracer and continuing over another of said pulleys and having a counterweight at its end, said tracer adapted to move up or down in said guide as the said dredging instrument is raised or lowered.

12. The combination in a laterally movable dredge, of a vertically adjustable dredging instrument, a reducing motion actuated by said dredging instrument, a diagram table mounted on the dredge, a guide secured over said table, a tracer slidably mounted in said guide, a plurality of pulleys mounted on said guide, a wire leading from said reducing motion passing over one of said pulleys, secured to said tracer and continuing over another of said pulleys and having a counterweight at its end, said tracer adapted to move up or down in said guide as said dredging instrument is raised or lowered, and means mounted on said dredge to disclose the amount of lateral movement of the dredge.

13. The combination in a laterally movable dredge, of a cutter ladder, a vertically adjustable dredging instrument suspended therefrom, a frame, a shaft mounted on said frame, a plurality of drums mounted on said shaft, a wire wound upon one of said drums having its upper end secured to said drum and its lower end secured to said cutter ladder, a wire carrying a counterweight wound upon and secured to another of said drums, a diagram table mounted on the dredge, a guide mounted over said table, a tracer slidably mounted in said guide, a plurality of pulleys mounted on said guide, a wire wound around said shaft and having one end secured thereto, said wire passing over one of said pulleys, secured to said tracer and continuing over another of said pulleys and having a counterweight at its end, said tracer adapted to move up or down in said guide as the said dredging instrument is raised or lowered.

14. The combination in a laterally movable dredge, of a cutter ladder, a vertically adjustable dredging instrument suspended therefrom, a frame, a shaft mounted on said frame, a plurality of drums mounted on said shaft, a wire wound upon one of said drums having its upper end secured to said drum and its lower end secured to said cutter ladder, a wire carrying a counterweight wound upon and secured to another of said drums, a diagram table mounted on the dredge, a guide mounted over said table, a tracer slidably mounted in said guide, a plurality of pulleys mounted on said guide, a wire wound around said shaft and having one end secured thereto, said wire passing over one of said pulleys, secured to said tracer and continuing over another of said pulleys and having a counterweight at its end, said tracer adapted to move up or down in said guide as the said dredging instrument is raised or lowered, and means mounted on the dredge to disclose the amount of lateral movement of the dredge.

15. The combination in a laterally movable dredge, of a diagram table mounted on the dredge, a tracer movable over the diagram table, a gyroscopic sighting device and connections therefrom to the tracer to move the tracer in relation to the table as the angular relation of the dredge and sighting device changes.

16. The combination in a laterally movable dredge, of a diagram table mounted on the dredge, a tracer movable over the diagram table, a gyroscopic sighting device, connections therefrom to the tracer to move the tracer in relation to the table as the angular relation of the dredge and sighting device changes, a vertically adjustable dredging instrument, and connections therefrom to the tracer to change the position of the tracer in relation to the table as the said dredging instrument is raised or lowered.

17. The combination in a laterally movable dredge, of a diagram table mounted on the dredge, a tracer movable over the diagram table, a gyroscopic sighting device comprising a base, a column swiveled on said base, a shaft, a fly wheel mounted on said shaft, a motor mounted on said shaft, and connections from said sighting device to said tracer to move the tracer in relation to the table as the angular relation of the dredge and sighting device changes.

18. The combination in a laterally movable dredge, of a diagram table mounted on the dredge, a tracer movable over the diagram table, a gyroscopic sighting device comprising a base, a column swiveled on said base, a shaft, a fly wheel mounted on said shaft, a motor mounted on said shaft, connections from said sighting device to said tracer to move the tracer in relation to the table as the angular relation of the dredge and sighting device changes, a vertically adjustable dredging instrument, and connections therefrom to the tracer to change the position of the tracer in relation to the table as the dredging instrument is raised or lowered.

19. The combination in a laterally movable dredge, of a diagram table mounted on the dredge, a base, a track secured to said base, a guide mounted over said table, said guide provided at its base with a plurality of rollers adapted to run upon either side of said track, a tracer mounted in said guide, a gyroscopic sighting device, and connections therefrom to said tracer to move the tracer in relation to the table as the angular relation of the dredge and sighting device changes.

20. The combination in a laterally movable dredge, of a diagram table mounted on the dredge, a base, a track secured to said base, a guide mounted over said table, said guide provided at its base with a plurality of rollers adapted to run upon either side of said track, a tracer mounted in said guide, a gyroscopic sighting device, and connections therefrom to said tracer to move the tracer in relation to the table as the angular relation of the dredge and sighting device changes, a vertically adjustable dredging instrument and connections therefrom to the tracer to change the position of the tracer in relation to the table as the dredging instrument is raised or lowered.

21. The combination in a laterally movable dredge, of a diagram table mounted on the dredge, a base, a track secured to said base, a guide mounted over said table, said guide provided with a plurality of rollers adapted to run upon either side of said track, a tracer mounted in said guide, a gyroscopic sighting device comprising a base, a column swiveled on said base, a shaft, a fly wheel mounted on said shaft, a motor mounted on said shaft, a sector mounted on said column, connections from said sector to said guide to move the tracer in relation to the table as the angular relation of the dredge and sighting device changes.

22. The combination in a laterally movable dredge, of a diagram table mounted on the dredge, a base, a track secured to said base, a guide mounted over said table, said guide provided with a plurality of rollers adapted to run upon either side of said track, a tracer mounted in said guide, a gyroscopic sighting device comprising a base, a column swiveled on said base, a shaft, a fly wheel mounted on said shaft, a motor mounted on said shaft, a sector mounted on said column, connections from said sector to said guide to move the tracer in relation to the table as the angular relation of the dredge and sighting device changes, and a vertically adjustable dredging instrument and connections therefrom to the tracer to change the position of the tracer in relation to the table as the dredging instrument is raised or lowered.

23. The combination in a laterally movable dredge, of a cutter ladder, a vertically adjustable dredging instrument suspended therefrom, a diagram table mounted on the dredge, a tracer movable over the diagram table, a frame, a reducing motion mounted upon said frame, connections therefrom to said cutter ladder and said tracer to change the position of the tracer in relation to the table as the dredging instrument is raised or lowered, a gyroscopic sighting device, and connections therefrom to said tracer to move said tracer in relation to the table as the angular relation of the dredge and sighting device changes.

24. The combination in a laterally movable dredge, of a cutter ladder, a vertically adjustable dredging instrument suspended therefrom, a diagram table mounted on the dredge, a tracer movable over the diagram table, a frame, a reducing motion mounted upon said frame, connections therefrom to said cutter ladder and said tracer to change the position of the tracer in relation to the table as the dredging instrument is raised or lowered, and a gyroscopic sighting device comprising a base, a column swiveled on said base, a shaft, a fly wheel mounted on said shaft, a motor mounted on said shaft, and connections from said sighting device to said tracer to move the tracer in relation to the table as the angular relation of the dredge and sighting device changes.

25. The combination in a laterally movable dredge, of a cutter ladder, a vertically adjustable dredging instrument suspended therefrom, a diagram table mounted upon the dredge, a tracer movable over the diagram table, a frame, a reducing motion comprising a shaft mounted on said frame, a plurality of drums mounted on said shaft, a wire wound upon one of said drums and having its upper end secured thereto and its lower end secured to said cutter ladder, a wire carrying a counterweight wound upon and secured to another of said drums, a wire secured at one end to said tracer and having its other end secured to and wound upon said shaft, said reducing motion adapted to change the position of the tracer in relation to the table as the dredging instrument is raised or lowered, and a gyroscopic sighting device and connections therefrom to said tracer to move said tracer in relation to said table as the angular relation of the dredge and sighting device changes.

26. The combination in a laterally movable dredge, of a cutter ladder, a vertically adjustable dredging instrument suspended therefrom, a diagram table mounted upon the dredge, a tracer movable over the diagram table, a frame, a reducing motion comprising a shaft mounted on said frame, a plurality of drums mounted on said shaft, a wire wound upon one of said drums and having its upper end secured thereto and its lower end secured to said cutter ladder, a wire carrying a counterweight wound upon and secured to another of said drums, a wire secured at one end to said tracer and having its other end secured to and wound upon said shaft, said reducing motion adapted to change the position of the tracer with relation to the table as the dredging instrument is raised or lowered, and a gyroscopic sighting device comprising a base, a column swiveled on said base, a shaft, a fly wheel mounted on said shaft, a motor mounted on said shaft, and connections from said sighting device to said tracer to move the tracer in relation to the table as the angular relation of the dredge and sighting device changes.

27. The combination in a laterally movable dredge, of a vertically adjustable dredging instrument, a frame, a reducing motion mounted upon said frame, a diagram table mounted on the dredge, a guide secured over said table, a tracer slidably mounted in said guide, a plurality of pulleys mounted on said guide, a wire leading from said reducing motion passing over one of said pulleys and secured to said tracer and continuing over another of said pulleys having a counterweight at its end, said tracer adapted to move up or down in said guide as the said dredging instrument is raised or lowered, and a gyroscopic sighting device and connections therefrom to the tracer to move the tracer in relation to the table as the angular relation of the dredge and sighting device changes.

28. The combination in a laterally movable dredge, of a cutter ladder, a vertically adjustable dredging instrument suspended therefrom, a frame, a shaft mounted on said frame, a plurality of drums mounted on said shaft, a wire wound upon one of said drums having its upper end secured to said drum and its lower end secured to said cutter ladder, a wire carrying a counterweight wound upon and secured to another of said drums, a diagram table mounted on the dredge, a guide mounted over said table, a tracer slidably mounted in said guide, a plurality of pulleys mounted on said guide, a wire wound around said shaft and having one end secured thereto, said wire passing over one of said pulleys and secured to said tracer and continuing over another of said pulleys and having a counterweight at its end, said tracer adapted to move up or down in said guide as the dredging instrument is raised or lowered, and a gyroscopic sighting device and connections therefrom to the tracer to move the tracer in relation to the table as the angular relation of the dredge and sighting device changes.

29. The combination in a laterally movable dredge, of a vertically adjustable dredging instrument, a frame, a reducing motion mounted upon said frame, a diagram table mounted on the dredge, a guide secured over said table, a tracer slidably mounted in said guide, a plurality of pulleys mounted on said guide, a wire leading from said reducing motion passing over one of said pulleys secured to said tracer and continuing over another of said pulleys and having a counterweight at its end, said tracer adapted to move up or down in said guide as the said dredging instrument is raised or lowered and a gyroscopic sighting device comprising a base, a column swiveled on said base, a shaft, a fly wheel mounted on said shaft, a motor mounted on said shaft and connections from said sighting device to said tracer to move the tracer in relation to the table as the angular relation of the dredge and sighting device changes.

30. The combination in a laterally movable dredge, of a vertically adjustable dredging instrument, a frame, a reducing motion mounted on said frame, a diagram table mounted on the dredge, a guide secured over said table, a tracer slidably mounted in said guide, a base, a track secured to said base, a plurality of rollers mounted on said guide and adapted to run on either side of said track, a plurality of pulleys mounted on said guide, a wire leading from said reducing motion passing over one of said pulleys, secured to said tracer and continuing over another of said pulleys, and having a counterweight at its end, said tracer adapted to move up or down in said guide as the said dredging instrument is raised or lowered, and a gyroscopic sighting device and connections therefrom to said tracer to move the tracer in relation to the table as the angular relation of the dredge and sighting device changes.

31. The combination in a laterally movable dredge, of a vertically adjustable dredging instrument, a frame, a reducing motion mounted on said frame, a diagram table mounted on the dredge, a guide secured over said table, a tracer slidably mounted in said guide, a base, a track secured to said base, a plurality of rollers mounted on said guide and adapted to run on either side of said track, a plurality of pulleys mounted on said guide, a wire leading from said reducing motion passing over one of said pulleys secured to said tracer and continuing over another of said pulleys, and having a counterweight at its end, said tracer adapted to move up or down in said guide as the said dredging instrument is raised or lowered, and a gyroscopic sighting device comprising a base, a column swiveled on said base, a shaft, a fly wheel mounted on said shaft, a motor mounted on said shaft, a sector mounted on said column, connections from said sector to said guide to move the tracer in relation to the table as the angular relation of the dredge and sighting device changes.

32. The combination in a laterally movable dredge, of a cutter ladder, a vertically adjustable dredging instrument suspended therefrom, a frame, a shaft mounted on said frame, a plurality of drums mounted on said shaft, a wire wound upon one of said drums having its upper end secured to said drum and its lower end secured to said cutter ladder, a wire carrying a counterweight wound upon and secured to another of said drums, a diagram table mounted on the dredge, a guide mounted over said table, a tracer slidably mounted in said guide, a base, a track secured to said base, a plurality of rollers mounted on said guide and adapted to run on either side of said track, a plurality of pulleys mounted on said guide, a wire wound upon said shaft and having one end secured thereto passing over one of said pulleys and secured to said tracer and continuing over another of said pulleys and having a counterweight at its end, said tracer adapted to move up or down in said guide as the said dredging instrument is raised or lowered and a gyroscopic sighting device comprising a base, a column swiveled on said base, a shaft, a fly wheel mounted on said shaft, a motor mounted on said shaft, a sector mounted on said column, connections from said sector to said guide to move the tracer in relation to the table as the angular relation of the dredge and sighting device changes.

Signed by us at Boston, Suffolk county, Massachusetts, this first day of January, 1908.

HARRISON SOUTHWICK TAFT.
ULDRIC THOMPSON, Jr.

Witnesses:
 ODIN ROBERTS,
 CHARLES D. WOODBERRY.